Dec. 24, 1940.  E. R. BARRETT  2,226,192
FLUID CONTROL DEVICE
Filed March 30, 1938  5 Sheets-Sheet 1
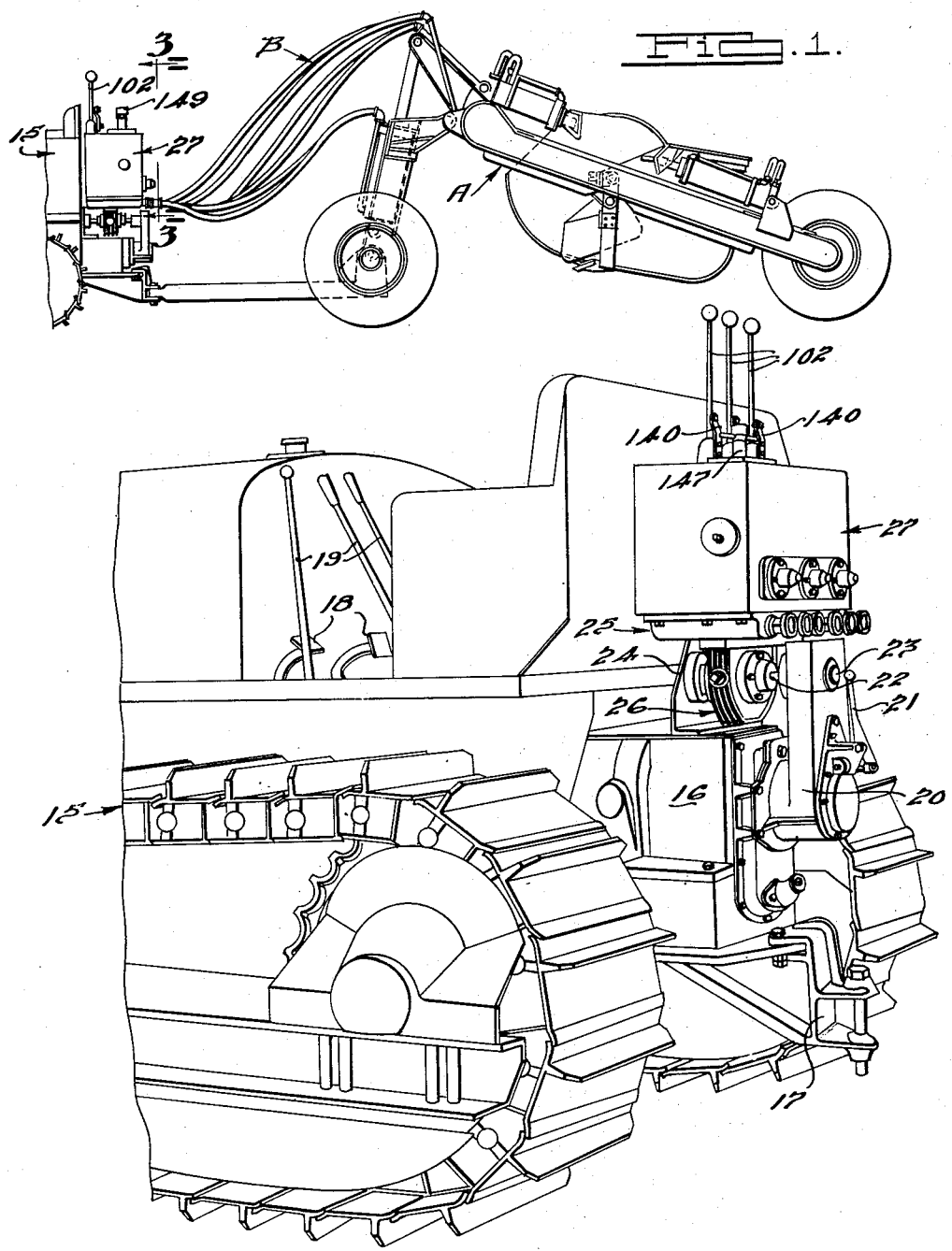
INVENTOR
Edward R. Barrett
BY Harness, Dickey & Pierce
ATTORNEYS.

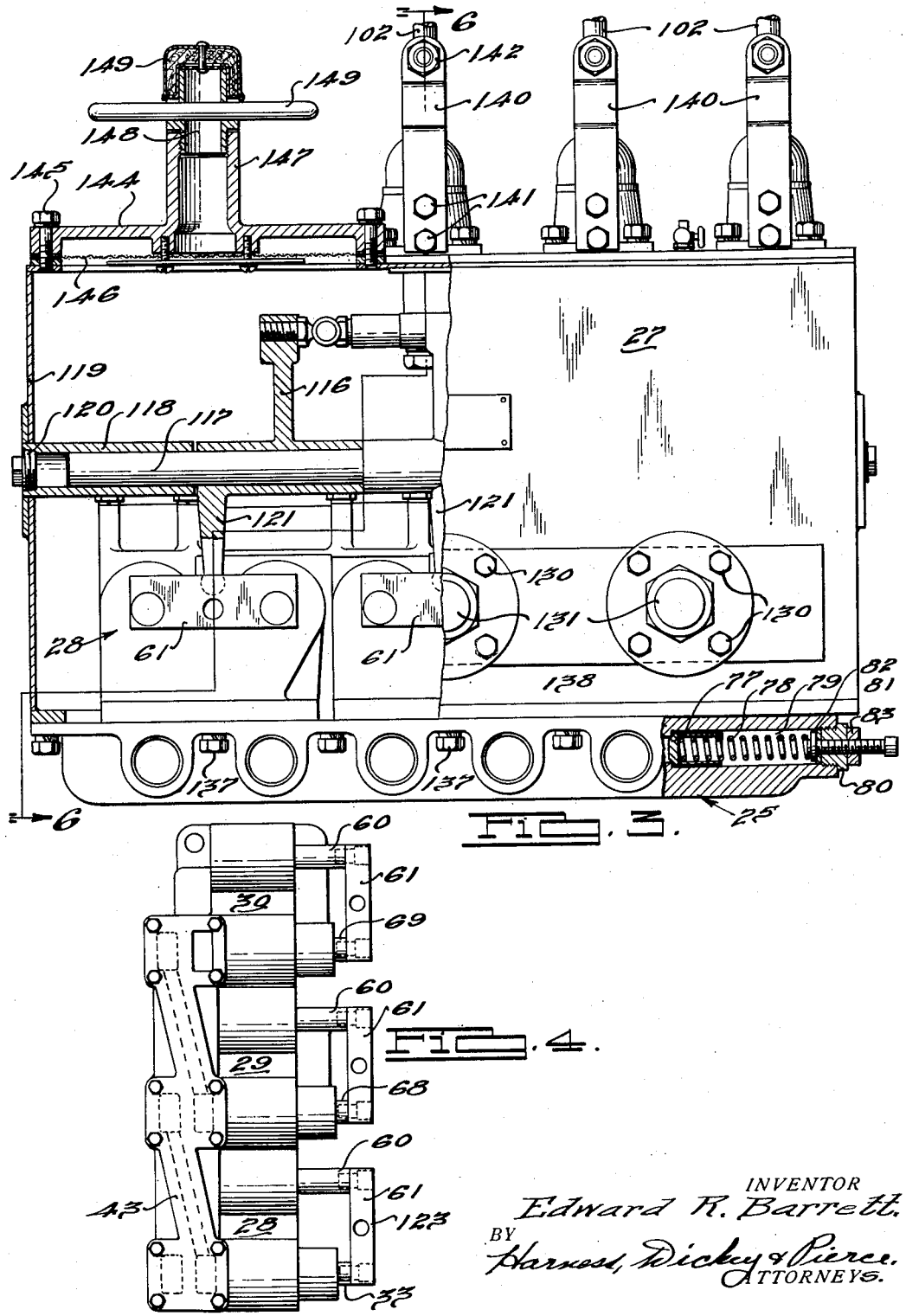

Dec. 24, 1940.  E. R. BARRETT  2,226,192
FLUID CONTROL DEVICE
Filed March 30, 1938  5 Sheets-Sheet 3
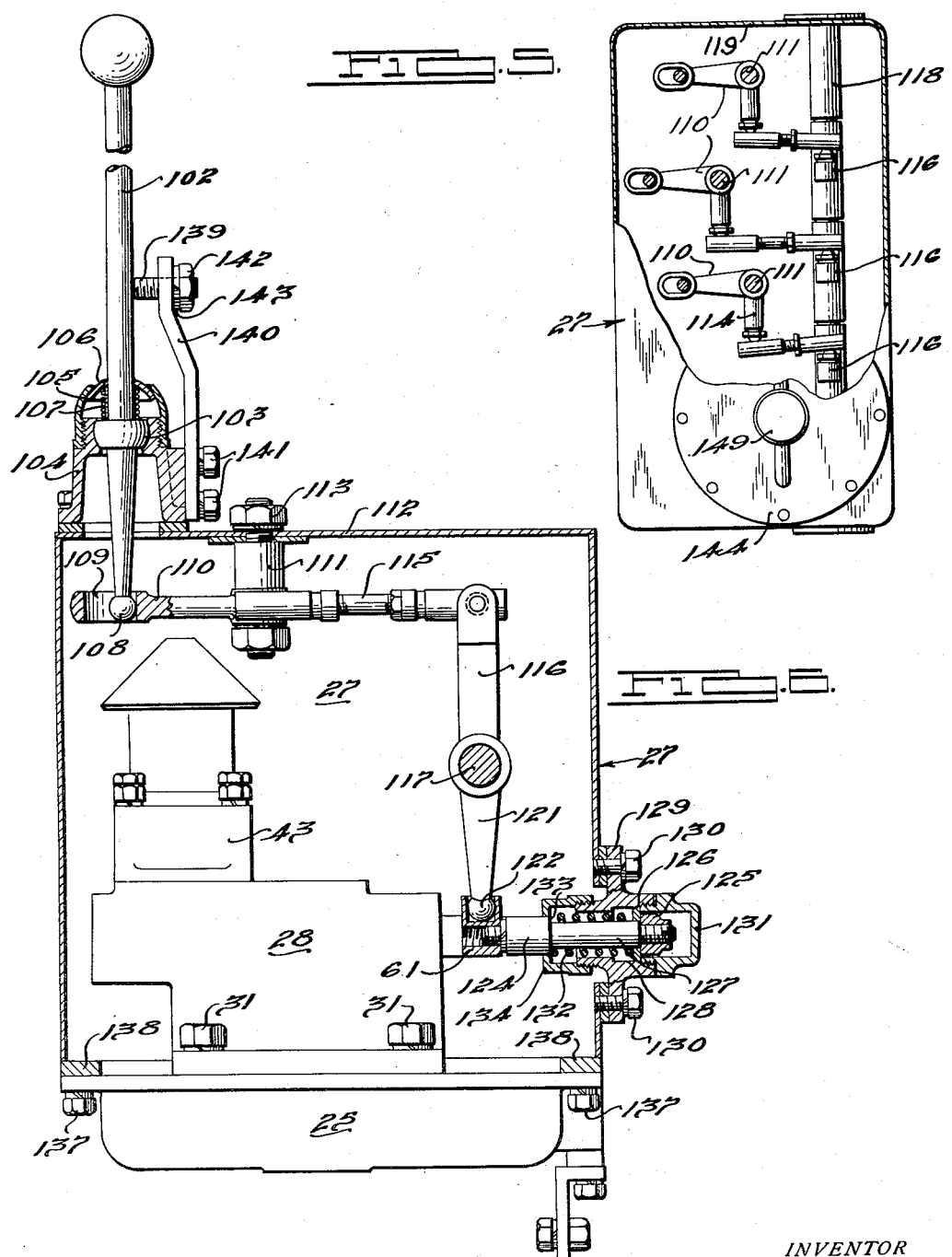

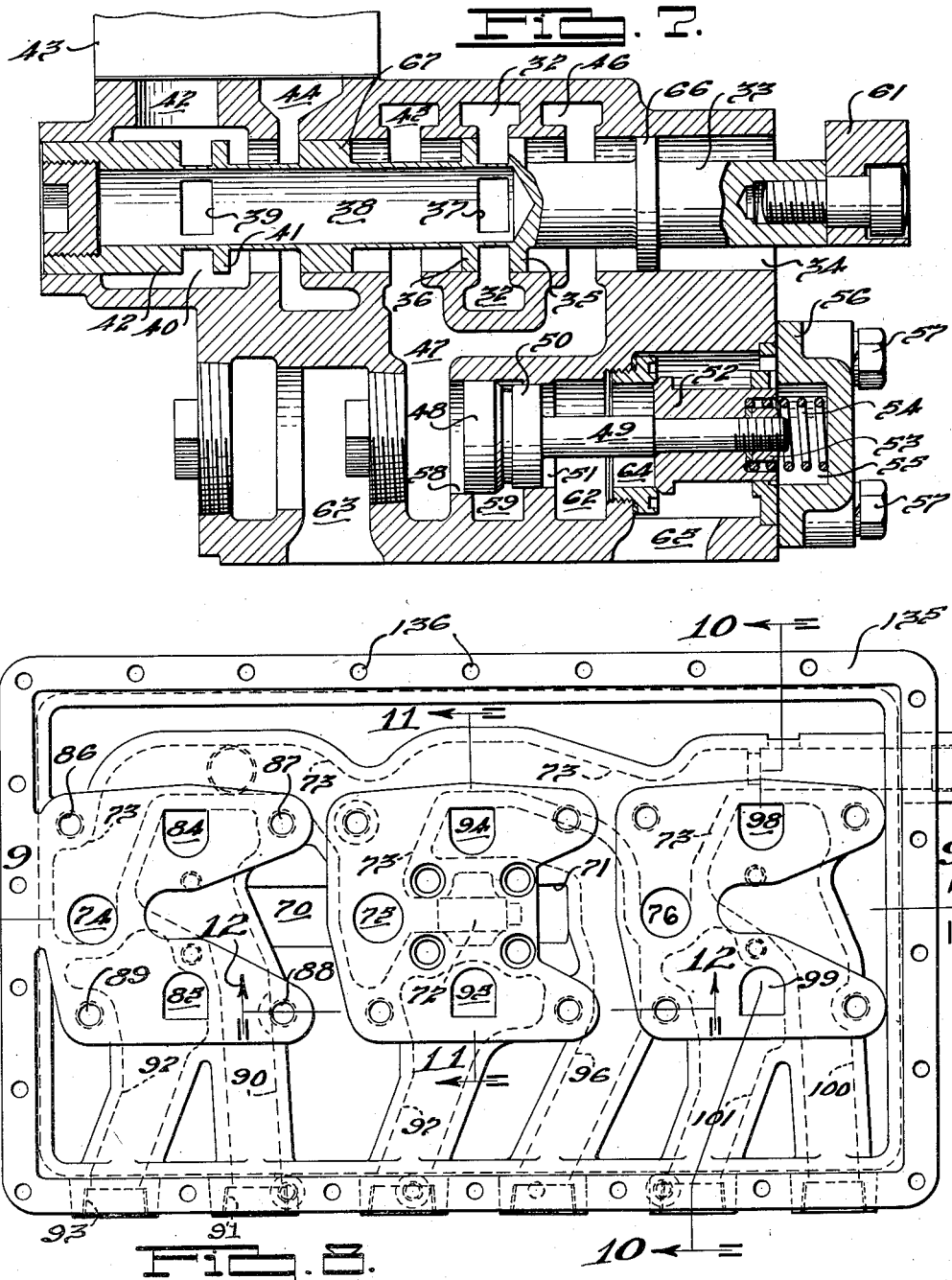

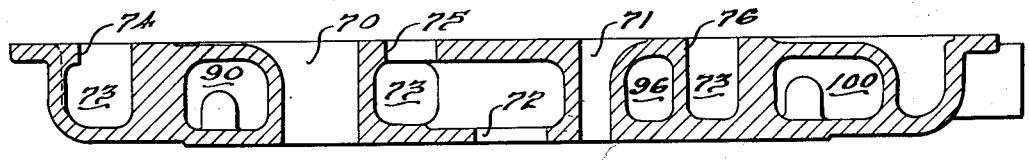
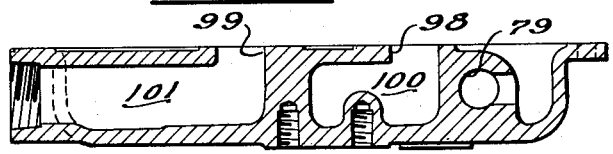
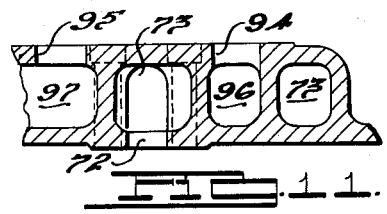
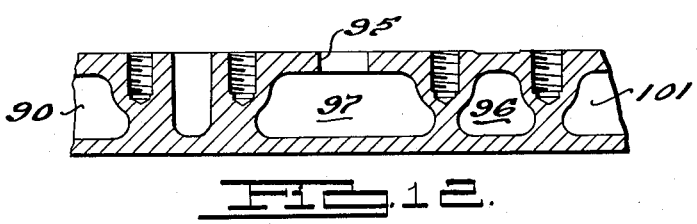
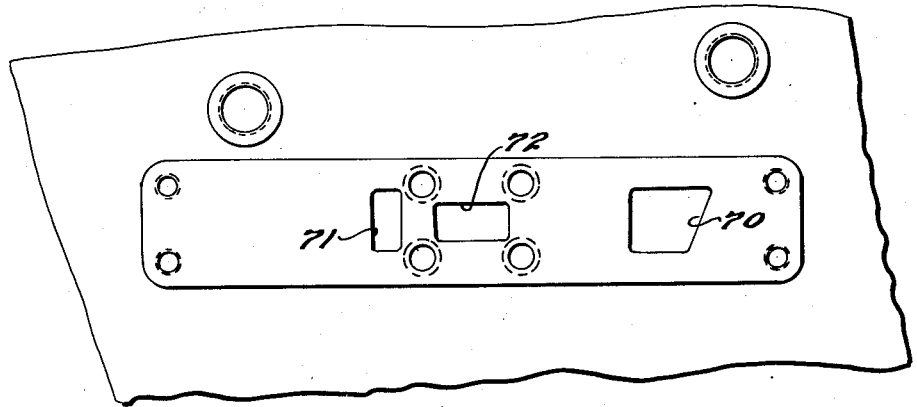

Patented Dec. 24, 1940

2,226,192

UNITED STATES PATENT OFFICE 2,226,192

FLUID CONTROL DEVICE

Edward R. Barrett, Detroit, Mich., assignor to Gar Wood Industries, Inc., Detroit, Mich., a corporation of Michigan Application March 30, 1938, Serial No. 198,972

3 Claims. (Cl. 137—139)

This invention relates to pressure fluid control devices particularly useful for controlling and operating earth working machinery which is pulled by a tractor.

The main objects of this invention are to provide a fluid control unit comprising a pump, distributor manifold, control valves and fluid reservoir, all compactly arranged and adapted to be connected to the power take-off of a tractor; to provide such a unit in which the control handles or levers are positioned closely and conveniently to the driver of the tractor; to provide a fluid control unit which is mounted on the tractor by spaced supports attached to the distributing manifold to the lower side of which is attached the fluid pressure pump and on the top side of which is attached the control valves and encompassing fluid reservoir; and to provide a plurality of control valves which are automatically returned to neutral positions after having been manually moved to pass fluid under pressure to the hydraulic jack cylinders connected thereto.

An illustrative embodiment of this invention is shown in the accompanying drawings, in which:

Fig. 1 is a view in side elevation of an earth working device pulled by a tractor and showing the hydraulic controls thereof connected to the fluid pressure control device which is mounted on the rear end of the tractor and driven by the power take-off thereof.

Fig. 2 is an enlarged fragmentary view in perspective of the rear end of a tractor showing the fluid control unit mounted thereon and connected to be driven by the power take-off of the tractor.

Fig. 3 is a view partly in elevation and partly in vertical section of the fluid pressure control manifold, reservoir and enclosed valves and operating handles taken generally from the position indicated by the line 3—3 of Fig. 1 looking in the direction indicated by the arrows.

Fig. 4 is a plan view of the three control valves and interconnecting top manifold for the same.

Fig. 5 is a top plan view of the reservoir with the control handles and part of the top wall broken away to show the control levers.

Fig. 6 is a transverse vertical sectional view taken generally along the line 6—6 of Fig. 3 with parts of the mechanism left in elevation.

Fig. 7 is an enlarged vertical sectional view through one of the valves.

Fig. 8 is a top plan view of the distributing manifold upon which the valves and reservoir are mounted.

Fig. 9 is a sectional view taken on the line 9—9 of Fig. 8 looking in the direction indicated by the arrows.

Fig. 10 is a sectional view taken along the line 10—10 of Fig. 8 looking in the direction indicated by the arrows.

Fig. 11 is a fragmentary sectional view taken on the line 11—11 of Fig. 8 looking in the direction indicated by the arrows.

Fig. 12 is a fragmentary sectional view taken along the line 12—12 of Fig. 8 looking in the direction indicated by the arrows.

Fig. 13 is a fragmentary bottom plan view showing the longitudinal medial part thereof which forms the seat or base to which the fluid pump is attached.

In the construction shown in the drawings, the earth working device generally designated A is of the type more fully disclosed and described in applicant's copending application, Serial No. 97,490, filed August 24, 1936, and is of the type which is operated by hydraulic jack cylinders to which fluid is supplied by flexible hose lines B.

A tractor generally indicated 15, of the caterpillar tread type, is shown provided at its rear end with a power take-off 16, draw bar attachment 17, foot control pedals 18, and hand control levers 19, all in the usual manner of tractors of this character.

The power take-off, as is customary, has a driven shaft protruding horizontally from the enclosing gear box 16, and in the present instance this shaft is provided with a silent chain gear (not shown) and enclosed by a housing 20. A gear shift lever 21 is provided for throwing the power take-off into and out of gear in the customary manner. The housing 20 extends upwardly and is of rectangular hollow horizontal section to enclose a silent chain driven by the power take-off gear which passes around another gear of like character secured to a fluid pump shaft 22, one end of which is journaled in the upstanding portion 23 of the power take-off housing, and the other end of which is journaled in a bracket 24 which is mounted upon the power take-off gear box 16.

The upper ends of the power take-off housing 20 and the bracket 24 are attached to and support a distributing manifold, generally indicated 25, at opposite sides thereof so as to give a rigid support to the manifold at spaced points. A fluid pressure pump, generally designated 26, of the type fully described in applicant's copending application, Serial No. 150,661, filed June 28, 1937, is mounted upon the underside of the manifold 25 and supported thereby, and a reservoir 27 is mounted upon the top side of the manifold 25 and supported thereby.

The reservoir 27 encompasses and encloses fluid control valve assemblies 28, 29 and 30 which are securely fixed to the top side of the distributing manifold 25 by cap screws 31.

The valve assemblies 28, 29 and 30 are generally of the same construction as those more fully shown and described in applicant's copending application hereinabove first referred to, and as shown in Fig. 7 comprise a casing having an intake port 32, an axially slidable control valve plunger 33 which is movable in a cylindrical bore 34. The valve plunger 33, adjacent the intake port 32, is provided with two axially spaced radially disposed annular flanges 35 and 36 which snugly fit the bore 34, and the plunger 33, at the point between the flanges 35 and 36, is provided with ports 37 which provide communication between the intake port 32 and an axially extending bore 38 formed in the valve plunger 33. The valve plunger 33 near its inner end is also provided with ports 39 which permit fluid within the bore 38 to pass out into an annular surrounding port 40. The port 39 is located between a radially extending annular flange 41 and a large head portion 42 of the plunger valve 33, both of which snugly fit the bore 34.

The port 40 communicates with a port 42 which for this assembly is blocked off by the manifold 43 but when the valve is in the position shown in Fig. 7, the port 40 communicates with a port 44 which leads to the manifold 43.

The casing is also provided with passageways 45 and 46 which surround the valve and both of which communicate with the passageway 47 which leads to a valve head 48 formed on one end of a valve stem 49. The valve stem 49 also carries a guide 50 which is snugly slidable in the bore 51. The other end of the valve stem 49 has a check valve 52 secured thereto by a nut 53, and a helical compression spring 54 normally urges the valve 52 upon its valve seat, one end of the spring abutting the valve 52 and the other end thereof being enclosed in and bearing against the blind end of a socket 55 formed in a cover cap 56 which is secured to the valve body by cap screws 57.

The valve head 48 snugly fits a bore 58 when the valve 52 is on its seat, but when pressure is exerted against the valve head 48 the valve assembly moves against the action of the compression spring 54 so as to provide communication between the passageway 47 and a port or passageway 59 which leads laterally to a second plunger control valve not illustrated herein but which is fully disclosed and described in applicant's above referred to copending application and which is shown by the reference numeral 60 in Fig. 4. The valve 60 is connected to the valve 33 by a bus bar 61 so as to move both of said valves in unison.

Fluid from the valve 60 is returned through either the passageway 62 or the passageway 63 depending upon which way the valve assemblies are moved from the central neutral position. Fluid returned from the passageway 62 passes through the valve seat 64 past the valve 62 and into a discharge port or passageway 65.

Fluid is confined in the surrounding ports 45 and 46 and passageway 47 by an annular flange 66 integrally formed on the valve stem 33 and a similar flange 67 also integrally formed on the valve stem 33, both of which snugly fit the bore 34 and prevent the passage of fluid therearound.

The valve assemblies 29 and 30 are of substantially identical construction as the valve assembly 28 with the exception that the valve plungers 68 and 69 of the valve assemblies 29 and 30, respectively, are not provided with any hollow bore therein similar to the bore 38 of valve plunger 33.

The manifold 25, upon which the valve assemblies 28, 29 and 30 are mounted, is provided with intake ports 70 and 71 which provide communication between the fluid reservoir 27 and the intake side of the fluid pressure pump 26. Fluid from the pump 26 is returned under pressure through a port 72 to a passageway 73 which extends circuitously from one end to the other of the manifold and from which fluid is discharged under pressure through outlet ports 74, 75 and 76 which are in registry with the intake ports of the valve assemblies 28, 29 and 30, respectively.

A pressure relief valve, shown more clearly in Fig. 3 of the drawings, is provided in the usual manner for by-passing fluid into the reservoir when the pressure within the manifold passageway 73 reaches a predetermined amount. The pressure relief valve comprises a cylindrical hollow valve member 77 yieldingly urged against its seat by a helical compression spring 78, the assembly being confined in a bore 79 of the manifold by a plug 80 threaded into the outer end of the bore. The plug 80 is axially threaded to receive a set screw 81, the inner end of which is provided with enlarged head 82 which abuts one end of the spring 78 for adjusting the tension thereon, and a lock nut 83 is provided for securing the set screw 81 in adjusted position.

The top surface of the manifold 25 is also provided with port openings 84 and 85 which are in registry with the valve ports 63 and 65 of the valve assembly 28, said valve assembly being mounted on a smooth planed surface of the manifold which extends around the port 74, 84 and 85, and which contains cap screw threaded openings 86, 87, 88 and 89. The port opening 84 leads to a passageway 90 which has a discharge end 91 at the rear side edge of the manifold adapted to be threaded to receive hose fittings and couplings. In like manner the port opening 85 communicates with a manifold passageway 92, the outer end 93 of which is adapted to be threaded to receive the hose fittings.

The top surface of the manifold is in like manner provided with port openings 94 and 95 which communicate with manifold passageways 96 and 97, respectively, the port openings 75, 94 and 95 being in registry with ports of the valve assembly 29 in the same manner as described with respect to the valve assembly 28. Also port openings 98 and 99 are provided adjacent the port opening 76 and which provide communication with manifold passageways 100 and 101, respectively, in the same manner and relation as heretofore described, these passageways 73, 98 and 99 registering with ports of valve assembly 30.

Means are provided for operating the valve plungers of the valve assemblies 28, 29 and 30 independently and manually, and the controls for all three valves are of like character, therefore an explanation of the one as illustrated most clearly in Figs. 5 and 6 will suffice for all. A hand lever 102 is rockably pivoted on a semispherical seat 103 formed in an upstanding bracket 104 and held thereon by caps 105 and 106, the cap 105 being threaded to the bracket 104, and the cap 106 being restrained by the cap 105 and having a helical compression spring 107 after the usual manner of gear shift levers.

The hand lever 102 extends below its point of rocking movement and terminates in a ball head 108 which is snugly received in a slot 109 formed in the end of an arm 110 of a bell crank lever which is mounted for movement in a horizontal plane on a vertically disposed support 111 which is secured to the top 112 of reservoir 27 by a nut 113. The other arm 114 of the bell crank lever terminates in a ball head which is universally mounted in one end of an axially adjustable link 115. The other end of the link 115 receives a similar ball head mounted on the upper end of a vertically disposed lever 116 which is pivoted for oscillating or rocking movement on a cross shaft 117, the opposite ends of which are mounted in sleeves 118 which are rigidly secured to the end walls 119 of the reservoir 27. The outer ends of the sleeves 118 are closed by threaded plugs 120. A downwardly extending arm 121 of the lever 116 terminates in a ball head 122 which is received in a socket 123 formed in the top side of the bus bar 61.

Means are provided for yieldingly urging the bus bar 61 and valve plungers connected thereto to a middle neutral position when moved in either direction therefrom and comprise a shaft 124 having one end threaded into the bar 61 and the other end provided with a nut 125 which abuts a washer 126 slidable on a reduced portion 127 of the shaft. The washer 126 is slidable in a bore 128 of a fitting 129 which is secured to the reservoir by cap screws 130. A cap 131 is threaded into the fitting 129 which encloses the nut 125 and abuts against the washer 126 so as to limit its sliding movement in a direction to the right, as viewed in Fig. 6, while permitting movement of the shaft 124 with its nut 125 in that direction. A helical compression spring 132 surrounds the reduced portion 127 of the shaft, and has one end thereof bearing against the washer 126 and the other end thereof bearing against a shoulder 133 formed by the reduction of the diameter of the shaft 124. A cup-shaped cap 134 is threaded on to the fitting 129 and has an opening therethrough for receiving the shaft 124 for sliding movement therethrough, the arrangement being such that the helical compression spring 132 will bear against both the shoulder 133 and the end wall of the cap so as to prevent the spring from moving the plunger to the left from the position shown in Fig. 6.

The marginal edge of the manifold 25, as indicated at 135 in Fig. 8, is provided with a plurality of openings 136 through which cap screws 137 are passed and which are threaded into an inwardly extending flange 138 welded to the lower edge of the reservoir 27 so that the reservoir is mounted upon and tightly sealed to the top side of the manifold 25 and completely surrounds and encompasses the valve assemblies 28, 29 and 30 with the operating leverages and link connections between the valves and their respective control handles 102 which are mounted on the top side 112 of the reservoir in a position to be conveniently grasped by the hand of the tractor operator. The handles 102 are engaged by a stud 139 which is threaded through the top end of a bracket 140, the lower end of which is rigidly secured to the support 104 by cap screws 141. The stud 139 may be adjusted as to its position with respect to the handle 102 by a nut 142 and lock washer 143 confined thereunder.

The top 112 of the reservoir 27 is provided with a manhole cover 144 secured thereto by cap screws 145, a filtering screen 146 being provided and having its marginal edge engaged between the top surface of the reservoir and the manhole cover. The middle of the manhole cover is provided with an upstanding filler neck 147, the top end of which is interiorly threaded to receive the exteriorly threaded collar of a filler cap 148 which is provided with a transverse pin 149 for facilitating its removal and replacement. The top end of the filler cap 148 is provided with filter material 149A in the usual manner of breather caps of this character, and through which air entering the reservoir must pass and thereby be cleaned and freed from dirt or other matter which might be injurious to the valve mechanisms and pressure pump.

In the operation of this apparatus the fluid pressure control unit is mounted upon the tractor 15 by the bracket 24 and chain drive housing 20, the upper ends of which are secured to the distributing manifold 25. Suitable hose lines B are connected to the six nozzle openings of the manifold and lead to the opposite ends of the three sets of operating hydraulic jack cylinders of the earth working device A in the usual manner.

Suitable fluid is placed in the reservoir 27 by removing the filler cap 148, such fluid necessarily passing through the filtering screen 146. Fluid in the reservoir 27 will pass down through the ports 70 and 71 into the fluid pressure pump 26 which is mounted on the underside of the manifold and fluid discharged by said pump returns to the manifold through the port opening 72 and into the passageway 73. Fluid from the passageway 73 passes to the valve assemblies 28, 29 and 30 through the ports 74, 75 and 76, respectively, so that each of the valves is independently supplied with fluid at all times.

When it is desired to operate the desired parts of the earth working device, the tractor operator grasps the control handle 102 and shifts the same either to the right or to the left with respect to the longitudinal center line of the tractor, thus rocking its bell crank lever on its vertical pivot 111 which through the connecting link 115 and vertical lever arm 116 will move the connecting bar 61 toward or away from the valve body. In either event the spring 132 is compressed and immediately upon release of the handle 102, the spring 132 will return the bar with its attached valve plungers to the center or neutral position.

With all three valve assemblies in neutral position and the fluid pressure pump 26 in operation, fluid is discharged by the pump through the manifold port 72 into the circuitous passageways 73, the outlet port 74 of which communicates with the port 32 of the valve assembly 28. From the port 32 the fluid passes into the port 37 to the central bore 38 of the plunger valve 33 and thence out through the port 39 therein into the surrounding port 40. From the port 40 the fluid will pass around the annular flange 41, along the plunger 33 and into the port 44 from whence it is discharged into the valve connecting manifold 43. Manifold 43 has passageways arranged therein so that the fluid is then discharged into the port 42 of the next succeeding valve assembly, i. e. 29 and as long as the plunger 33 of that valve is in neutral position it will bypass around the annular flange 41 and into the outlet passage 44 in the same manner as described with respect to the valve assembly 28.

From valve 29 the fluid will pass to the port 42 of valve assembly 30, and as long as its plunger 33 is in neutral position the fluid will be by-passed around its flange 41 and be discharged through a port in the top side thereof into the reservoir 27.

In this manner should any one of the valves 33 of the three valve assemblies be moved inwardly or outwardly from neutral position, the radial annular flange 67 or the annular flange 41 will close the passageway between the ports 42 and 44 and thus cause pressure to be built up within the manifold system.

Movement of the plunger valve 33 in either direction from neutral will not only cut off the flow of fluid from the intake port 32 into the valve plunger port 37 of the valve assembly 28, but will also cause the fluid from the port 32 to pass out into either the port 45 or the port 46, depending upon which way the valve is moved, thus causing a flow of fluid into the passageway 47 and against the valve head 48. Pressure against the head 48 will move the entire valve assembly against the action of the compression spring 54 and lift the check valve 52 from its seat and at the same time permit fluid from the passageway 47 to pass into the port 59, thence to the plunger valve 60 of the valve assembly, and then return the fluid back either to the port 62 or the port 63 depending upon which way the valve plungers 33 and 60 have been moved.

The ports 63 and 65 are in registry with the manifold ports 84 and 85 respectively thus passing the fluid into the manifold passageways 90 or 92, as the case may be. The passageway 92 is connected by suitable hose lines to that side of the hydraulic jack operating cylinders of the earth working machine which hold parts of the mechanism in raised position and retains the fluid in the manifold passageways, hose and jacks until the check valve 52 is again raised from its seat. From this arrangement it will be seen that the check valve is raised from its seat and that fluid under pressure flows into the passageway 47 regardless of which way the plunger valve 33 is shifted.

Each of the other valve assemblies 29 and 30 are of identical construction and operation as the assembly 28 with the exception that the valve plungers 33 thereof are not provided with the axial bore 38 and the inlet and outlet ports 37 and 39 respectively.

Although but one embodiment of this invention has been shown in detail, it will be apparent to those skilled in the art that numerous changes may be made therein without departing from the spirit and substance of the invention, as defined by the following claims.

What is claimed is:

1. In a fluid control unit for a tractor, a housing forming a fluid reservoir, a fluid control valve mounted within said housing, said valve including a reciprocable valve plunger, a control handle mounted on said housing, means mounted on said housing connecting said handle with said plunger, said last-named means including a bell crank element, means connecting one end of said element to said handle, and means connecting the other end of said element to said plunger, said last-named means including a resilient element and being so constructed and arranged that said plunger is resiliently urged to its neutral position when moved in either direction therefrom.

2. In a fluid control unit for a tractor, a housing forming a fluid reservoir, a fluid control valve mounted within said housing, said valve including a reciprocable valve plunger, a control handle mounted on said housing, means mounted on said housing connecting said handle with said plunger, said last-named means including a bell crank element, means connecting one end of said element to said handle, and means connecting the other end of said element to said plunger, said last-named means including a casing mounted on said housing, a compression spring disposed within said housing, means at opposite ends of said spring limiting movement thereof, an element slidable within said casing having means thereon for compressing said spring in both directions, and means connecting said last-named element to said other end of said first-named element and to said plunger, whereby said plunger is urged to its neutral position when moved in either direction therefrom.

3. In a fluid control unit for a tractor, a housing forming a fluid reservoir, a plurality of fluid controlled valves mounted within said housing, each of said valves including a reciprocable valve plunger, a control handle for each of said valves mounted on said housing, means connecting each of said handles with its corresponding plunger, said last-named means including bell crank elements rockably mounted upon a cross shaft, sleeves mounted on said housing and receiving the opposite ends of said shaft therein, means connecting one end of each of said bell crank elements to its handle, means connecting the other end of each of said bell crank elements to its plunger, said last-named means including a casing mounted on said housing, a compression spring disposed within said housing, means at opposite ends of said spring limiting movement thereof, an element slidable within said casing having means thereon for compressing said spring in both directions, and means connecting said last-named element to said other end of said first-named element and to said plunger, whereby said plunger is urged to its neutral position when moved in either direction therefrom.

EDWARD R. BARRETT.